(12) United States Patent
Brown (10) Patent No.: US 8,746,668 B2
(45) Date of Patent: Jun. 10, 2014

(54) TABLE SAW

(75) Inventor: Warren Brown, Mount Evelyn (AU)

(73) Assignee: Positec Power Tools (Suzhou) Co., Suzhou, jingsu (CN)

( * ) Notice: Subject to any disclaimer, the term of this patent is extended or adjusted under 35 U.S.C. 154(b) by 561 days.

(21) Appl. No.: 13/126,453

(22) PCT Filed: Oct. 29, 2009

(86) PCT No.: PCT/CN2009/074681
§ 371 (c)(1),
(2), (4) Date: Jul. 13, 2011

(87) PCT Pub. No.: WO2010/048890
PCT Pub. Date: May 6, 2010

(65) Prior Publication Data
US 2011/0259315 A1 Oct. 27, 2011

(30) Foreign Application Priority Data
Oct. 30, 2008 (CN) .......................... 2008 1 0194520

(51) Int. Cl.
*B28D 1/04* (2006.01)
*B28D 1/20* (2006.01)

(52) U.S. Cl.
USPC ...... 269/289 R; 269/291; 269/16; 144/286.1; 125/9; 125/13.01

(58) Field of Classification Search
USPC ..................... 144/286.1; 269/291, 289 R, 16, 269/136–138
See application file for complete search history.

(56) References Cited

U.S. PATENT DOCUMENTS

| 1,802,096 | A | * | 4/1931 | Tautz ........................ 144/117.1 |
| 2,085,603 | A | * | 6/1937 | Preston et al. ................. 30/477 |
| 2,595,483 | A | * | 5/1952 | Petter ......................... 144/117.1 |
| 2,771,104 | A | * | 11/1956 | Saxe .......................... 144/114.1 |
| 2,780,254 | A | * | 2/1957 | Carpentiere ............. 144/250.13 |
| 2,783,796 | A | * | 3/1957 | Glenn ........................ 144/253.6 |
| 2,888,965 | A | * | 6/1959 | Phillips ........................ 144/1.1 |

(Continued)

FOREIGN PATENT DOCUMENTS

| CN | 2314911 Y | 4/1991 |
| CN | 2096459 U | 2/1992 |

(Continued)

OTHER PUBLICATIONS

ISA/CN, International Search Report for PCT International Application No. PCT/CN2009/07468, Feb. 4, 2010, The State Intellectual Property Office, the P.R. of China, Beijing, China.

*Primary Examiner* — Lee D Wilson
*Assistant Examiner* — Tyrone V Hall, Jr.
(74) *Attorney, Agent, or Firm* — Fulwider Patton LLP (57) ABSTRACT

The present invention relates to a table saw, including: a work table, including a working surface for placing a workpiece; a fence, slidably arranged on said work table for support said work piece; a first motor, arranged below said working surface of the work table; a blade, driven by said first motor for cutting motion, and at least part of the blade is protruding out of the working surface of the work table in the cutting process, characterized in that: A planer detachably arranged on said work surface, said planer including a housing, a second motor located in said housing and a blade shaft driven by said second motor to rotate about its longitudinal axis.

17 Claims, 8 Drawing Sheets

(56) References Cited

U.S. PATENT DOCUMENTS

| | | | |
|---|---|---|---|
| 3,342,226 A * | 9/1967 | Marcoux et al. | 144/286.1 |
| 3,734,151 A * | 5/1973 | Skripsky | 144/286.5 |
| 4,105,055 A * | 8/1978 | Brenta | 144/286.1 |
| 4,201,254 A * | 5/1980 | Fehric | 144/1.1 |
| 4,265,283 A * | 5/1981 | Nash et al. | 144/286.5 |
| 4,265,284 A * | 5/1981 | Taylor | 144/287 |
| 4,335,765 A * | 6/1982 | Murphy | 144/286.1 |
| 4,427,042 A * | 1/1984 | Mitchell et al. | 144/1.1 |
| 4,445,412 A * | 5/1984 | Peters | 83/477.2 |
| 4,483,573 A * | 11/1984 | Keller | 312/281 |
| 4,516,612 A * | 5/1985 | Wiley | 144/1.1 |
| 4,546,804 A * | 10/1985 | Haeger | 144/1.1 |
| 5,024,257 A * | 6/1991 | Lloyd | 144/1.1 |
| 5,063,983 A * | 11/1991 | Barry | 144/371 |
| 5,431,206 A * | 7/1995 | McAllister | 144/286.1 |
| 2003/0034088 A1 * | 2/2003 | Manning | 144/286.1 |
| 2003/0097921 A1 * | 5/2003 | Wilke et al. | 83/477.2 |
| 2004/0144446 A1 * | 7/2004 | Wixey et al. | 144/114.1 |
| 2006/0101958 A1 * | 5/2006 | Garcia et al. | 83/13 |
| 2006/0144470 A1 * | 7/2006 | Fontaine | 144/286.1 |
| 2006/0219076 A1 | 10/2006 | Gass | |

FOREIGN PATENT DOCUMENTS

| | | |
|---|---|---|
| CN | 2460274 Y | 11/2001 |
| CN | 1100649 C | 2/2003 |
| CN | 2597174 Y | 1/2004 |
| CN | 101010176 A | 8/2007 |
| CN | 201279839 Y | 7/2009 |
| FR | 2 861 634 A1 | 5/2005 |
| GB | 2345027 A | 6/2000 |
| GB | 2359040 A * | 8/2001 |
| GB | 2 359 040 A | 8/2008 |
| JP | 10193301 A | 7/1998 |
| WO | 2006026551 A1 | 3/2006 |

* cited by examiner

Fig 8

TABLE SAW

CROSS-REFERENCE TO RELATED APPLICATIONS

This application is the national phase application of PCT International Application No. PCT/CN2009/074681, which has an International Filing Date of Oct. 29, 2010 and which claims the benefit of Chinese Patent Application No. CN200810194520.5, filed on Oct. 30, 2008, which are incorporated by reference in their entirety.

TECHNICAL FIELD

The present invention relates to a table saw, and more especially, to a table saw which can conduct both rough cutting and fine planing on workpieces.

BACKGROUND OF THE INVENTION

For brittle workpieces, traditional table saws can only conduct rough cutting on them. After the cutting, the zigzag broken edge will be left on the bottom of the cutting plane of the workpiece, and the desired effects of fine machining cannot be achieved.

In order to address this problem, the normal solution is to use other tools to conduct secondary machining to the workpiece after rough machining by the table saw, so that the cutting plane will achieve the required evenness and precision. However, this requires moving the workpiece frequently, and the specifications need multiple calibrations as well, which will result in complex operations and a long machining time. In order to overcome these shortages, technicians in this field have also made some improvement, such as adding a set of motor and a smaller auxiliary circular saw blade in front of the main circular saw blade; before pushing the workpiece toward the main circular saw blade, firstly, use the auxiliary circular saw blade to cut a slit on the bottom of the workpiece, and then use the main circular saw blade to cut it off. In this way, cutting work by the main circular saw blade has been moved from the bottom to a middle position, and there won't be a broken edge on the bottom of the workpiece. However, this device also has its obvious deficiency: compared with common table saws, it has been added with a set of motor and blade, which will generate a complicated internal structure and an increase in usage cost. In addition, the junction between the cutting tracks left by the main circular saw blade and the auxiliary circular saw blade still present unevenness.

Therefore, there is a requirement for a table saw which can not only simplify the complicated operations of rough machining by common saw tables, but also have a simple structure, a relative low manufacturing cost and effects of fine machining.

SUMMARY OF THE INVENTION

The purpose of the subject invention is to provide a simple and cheap table saw which can both conduct the rough cutting and precise planning on workpiece.

the subject invention provides: a table saw, including: a work table, including a working surface for placing a workpiece; a fence, slidably arranged on said work table for support said work piece; a first motor, arranged below said working surface of the work table; a blade, driven by said first motor for cutting motion, and at least part of the blade is protruding out of the working surface of the work table in the cutting process, characterized in that: A planer detachably arranged on said work surface, said planer including a housing, a second motor located in said housing and a blade shaft driven by said second motor to rotate about its longitudinal axis.

Preferably, when said planer arranged on said work surface, the longitudinal axis of said blade shaft keeps perpendicular to said work surface.

Preferably, said table saw including a scale ruler which connected to said working surface, the blade have an outer edge adjacent to said fence when it partly protruding out of the working surface of the work table, and the blade shaft have an outer edge adjacent to said fence when it arranged on said work surface, said outer edge of the blade and said outer edge of the blade shaft respectively align with a same scale mark of said scale rule.

Preferably, said table saw further including: a frame connected to the edge of said table, said scale rule slidably installed on the said frame, the same scale mark of said scale rule optionally align with the outer edge of the blade adjacent to said fence or the outer edger of the blade shaft adjacent to said fence.

Preferably, said blade forms a cutting plane at work for cut off the part of the work piece which beyond the cutting plane, when said planer arranged on said working surface and works, said blade shaft have a planning line for planning the part of the work piece outside the planning line, said cutting plane and said planning line substantially located in a same plane.

Preferably, said planning line is the blade shaft's most outer end away from the housing of planar, when said blade shaft been driven to rotate by said second motor.

Preferably, said blade is a circular saw blade.

Preferably, said blade is located below the work surface when said planer works.

Preferably, said table saw further including: a first installation mechanism located on said work surface, a second installation mechanism matching with said first installation mechanism located on said planar, said planar detachably installed on the work surface through said first installation mechanism and said second installation mechanism.

Preferably, said first installation mechanism are two screw holes set in the table, said second installation mechanism are two holes and two stud set in planers correspondingly.

Preferably, said fence includes two slide racks and a plate between said two slide rack, said slide rack slidably installed on the table saw, one of the slide rack includes a locking handle which operable lock the position of said fence.

Preferably, at least one side of said plate is a workpiece support surface which is parallel with said blade.

Preferably, said planer includes a housing, said housing has a planning surface perpendicular to the work surface, said blade shaft partly protrudes above said planning surface at radial direction.

Preferably, said planer including a guard, said guard rotatable mounted at said planning surface by a pin, said guard has a closing position at which said guard covers said blade shaft, and a opening position at which said guard uncovers said blade shaft, said guard connected to a spring which biasing said guard to said closing direction.

Preferably, said planer includes rollers, said rollers movable located in said housing of said planer, and optional protruding outside of said housing, so as to pressing said workpiece close to said fence.

Preferably, said rollers were cylindrical and connect to a spring which biasing said roller outside of said housing.

Preferably, said planer including a dust collection device.

Preferably, when said planer installed in the work table, the bottom of said blade shaft is below said work surface.

Preferably, said table saw further including: an adjust device located between said planer and said work table, said adjust device including a base fixedly connect to said work table and a adjustment screw fixedly connect to said planer, said adjustment screw removable installed on said base.

BRIEF DESCRIPTION OF THE DRAWINGS

The present invention is further detailed in combination with the drawings attached and embodiments hereinafter, wherein.

DETAILED DESCRIPTION OF THE INVENTION

By combing FIGS. 1 to 6, a description of the first preferred embodiment will be given hereinafter to explain the creation concept of the present invention.

Figure 1:
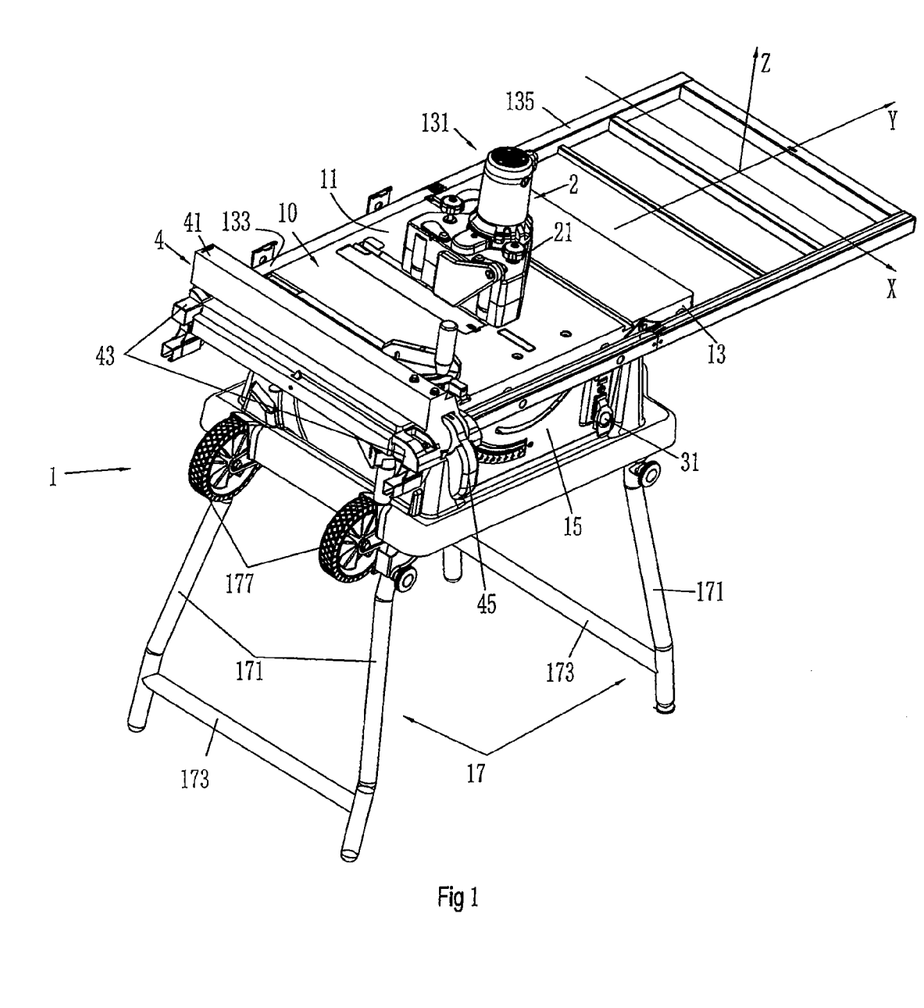
FIG. 1 is the solid drawing of the first embodiment for the subject invention.

As shown in FIG. 1, the table saw 1 includes a work table 10, which includes a working surface 11 and a edge 13; the working surface 11 is rectangular, with axis X parallel to its long side and axis Y parallel to its short side, as well as axis Z perpendicular to the working surface; the direction from the working surface 11 upward along axis Z is defined as the above of the table saw 1, and the direction from the working surface 11 downward along axis Z is defined as the below of the table saw 1; the direction toward the left of the figure along axis Y is defined as the front of the table saw 1, and the direction toward the right of the figure along axis Y is defined as the back of the table saw 1.

The edge 13 of the work table 10 is installed with an frame 131, and the frame 131 includes a fixed frame 133 which is fixedly connected to the edge and a mobile frame 135 which connects the said fixed frame 133 with the pivot, and the fixed frame 133 and the mobile frame 135 are horizontally parallel to each other; most part of the mobile frame 135 protrudes out from the work table 10 along the direction of axis Y, which works as the extended working surface, and the said mobile frame 135 can also pivot toward the said fixed frame 133 and cover on the working surface 11, which can save space. A fence 4 for workpiece support is slidably arranged on the said frame 131, and the fence 4 includes two slidable slide racks 43 correspondingly installed on the sides 134 of the fixed frame 133 and a plate 41 installed between the two slide racks 43; the plate 41 is parallel to axis X, and the front face or the end face of the plate 41 is perpendicular to the work table 10, which forms a workpiece support surface for workpiece support; the fence 4 also includes a locking handle 45 installed on one slide rack 43, and the locking handle 45 can be used optionally to lock the fence 4 at suitable position, or unlock the said the fence 4, which makes it able to slide on the frame 131 along the direction of axis Y; its embodiment is the convex block compact structure well known in the industry, so we will not elaborate here.

Preferably, the frame 131 is labelled with a scale (not shown in the figure) to indicate the cutting or planing specifications and determine the position of the fence 4, so appropriate specifications can be found during machining of the workpiece.

The table saw 1 also includes a working chamber 15 under the working table 10, and two sets of foldable carriages 17 are connected to the bottom of the working chamber 15, with each carriage 17 consisting of two legs 171 and a rod 173 which connects the two legs. The bottom of the front end of the working chamber 15 is connected with two rollers 177, and when the two sets of foldable carriages 17 fold, the table saw 1 can be conveniently moved by the rollers 177.

The working chamber 15 of the table saw 1 is installed with a cutting device 3 (see FIG. 3), and the outer wall of the working chamber 15 is installed with the power button 31 of the cutting device 3.

Figure 6:
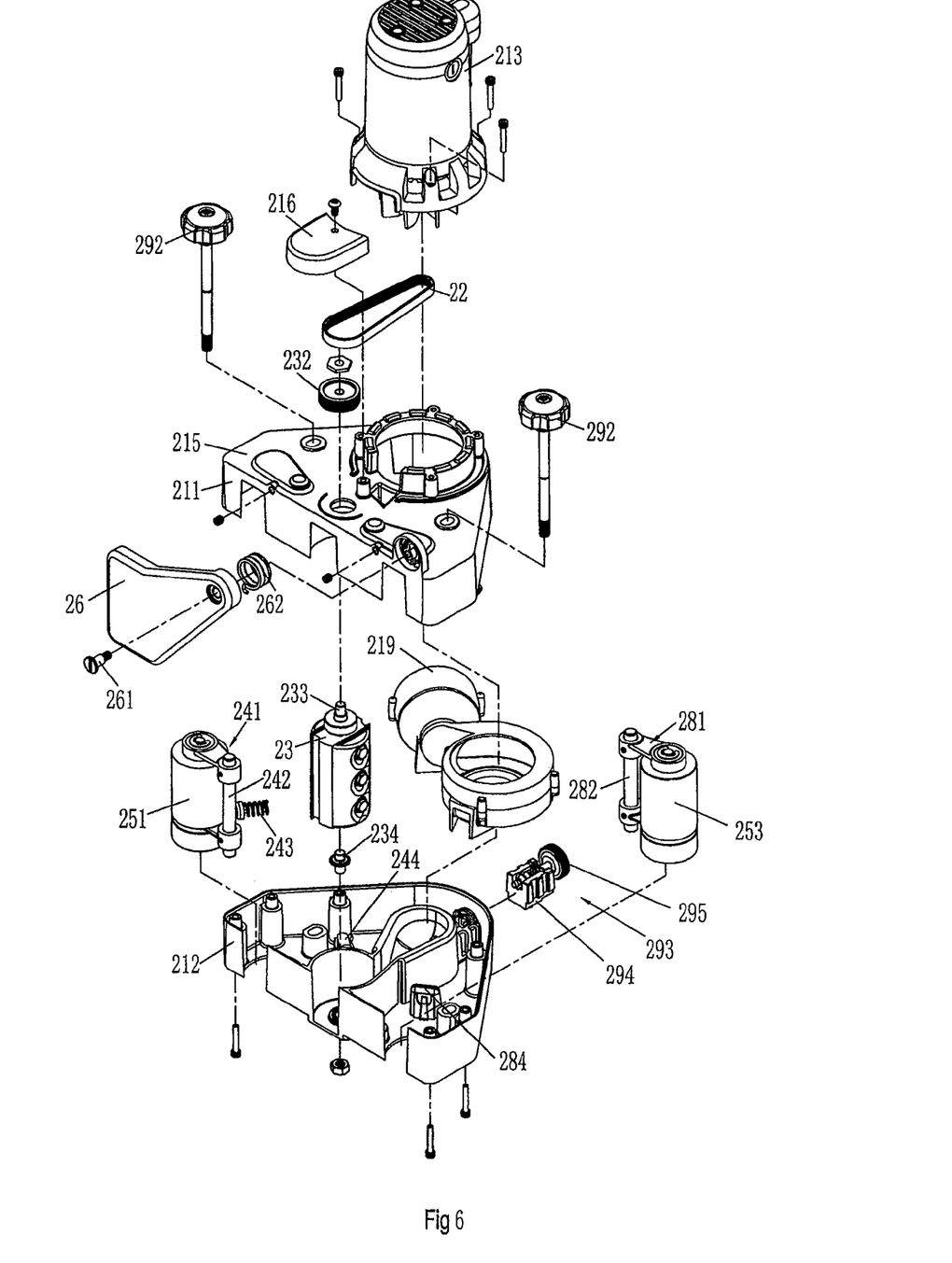
FIG. 6 is the exploded view of the planer of the first embodiment for the subject invention.

The working surface 11 of the table saw 1 is installed with a planer 2, and the planer 2 consists of a housing 21 and a blade shaft 23 (see FIG. 6). After installation, the position of the planer 2 corresponding to the work table 10 is fixed, and when the planer 2 is working, the blade shaft 23 will rotate and form a planing line with fixed position, which is parallel to axis Z; as well known in the industry, the blade of the blade shaft 23 is more protruding than other parts, so this planing line will be the most outer end of the blade away from the housing 21 of planer 2 during the rotation of the blade shaft 23. When the planer 2 is working, the workpiece is pushed along the direction of axis X, so the planing line and axis X cross and form a working surface during the working of planer 2; the part of the workpiece which is beyond the working surface will be planed, and the part not beyond the working surface will be retained.

Figure 2:
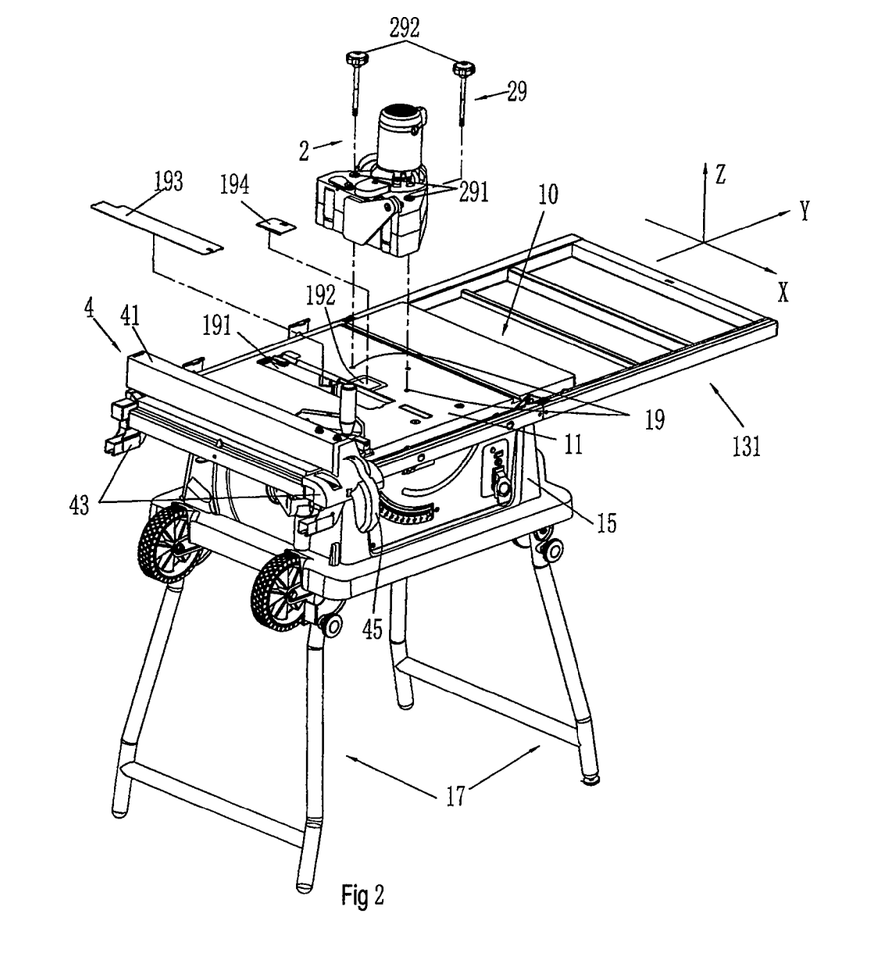
FIG. 2 shows the installing of the planer of the first embodiment for the subject invention.

As shown in FIG. 2, the work table is installed with a first installation mechanism 19, which is represented as two screw holes 19 in this embodiment, and the line formed by these two screw holes 19 is along the direction of axis X; corresponding installation on the planer 2 is a second installation mechanism 29, which is represented as two holes 291 and two studs 292 which should traverse the said holes 291 on the housing 21 and be installed in the said screw holes 19. By using the said matching screw holes 19 and studs 292, the planer 2 can be detachably arranged on the work table 10. The first installation mechanism 19 and the second installation mechanism 29 have multiple optional embodiments, for example, the first installation mechanism 19 can be a slot and the second installation mechanism 29 can be a corresponding convex, and we won't elaborate here.

The work table 10 is provided with a long slot 191 and a short slot 192, which are interconnected; the long slot 191 is a hole that goes through the working chamber 15, and the short slot 192 is a concave installed on the work table 10, the shape of which shall match that of the convex 214 below the housing 21 of the planer 2 (see FIG. 5). The shapes of a long board 193 and a short board 194 shall match the shapes of the long slot 191 and the short slot 192 respectively, which shall be installed above the long slot 191 and the short slot 192. When the cutting device 3 is working, the long board 193 is moved away to expose the long slot 191, and the short board 194 covers the short slot 192; when the planer 2 is working, the long board 193 covers the long slot 191, and the short board 194 is moved away to expose the short slot 192.

Figure 3:
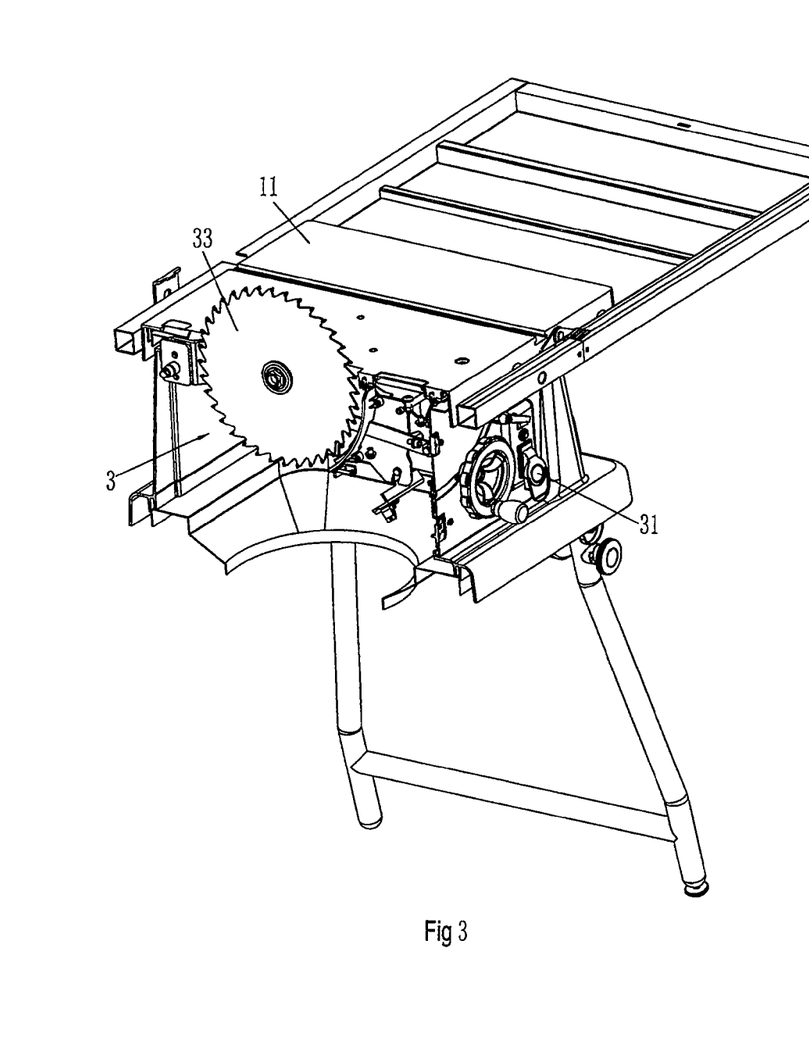
FIG. 3 is the cutting mechanism of the first embodiment for the subject invention.

As shown in FIG. 3, the cutting device 3 includes a first motor (not shown in the figure) and a blade 33 which conducts the cutting movement with the first motor; it is represented as a circular saw blade 33, which is almost parallel to axis X and can move up and down along axis Z; when it moves upward, it can go through the long slot 191 part and be above the working surface 11, and when it moves downward, it can be under the working surface 11. The embodiment of its moving upward and downward is well known to technicians in this field, and we will not elaborate here. When the cutting device 3 is working, the circular saw blade 33 rotary cuts the workpiece, and due to the thickness of the circular saw blade 33, two cutting planes will be formed from the cutting from the circular saw blade 33, and the one close to the front end of the work table 10 is called the front cutting plane, and that close to the back end of the work table 10 is called the back cutting plane. Both the front cutting plane and the back cutting plane are parallel to the plane formed by axis X and axis Z, and perpendicular to the work table 10. As well known in the industry, when the cutting device 3 is working, the part outside of the range between the front cutting plane and the back cutting plane will be cut off, and in accordance with the actual working situation, of the front cutting plane and the back cutting plane, the one that is closer the fence 4, i.e., one cutting plane of the initial position of the workpiece is the working surface of the circular saw blade 33, and the part of the workpiece which is beyond this working surface will be cut off, and the part which does not exceed the working surface will be retained.

Preferably, the location and installation location of blade shaft 23 of planer 2 have been preset, so that the planing line will be generally in the front cutting plane. Due to manufacturing and assembly errors, in reality, it is impossible that the planing line can be precisely located on the front cutting plane; however, this error is within the range of tolerable errors required by the machining, i.e., the planing line will be generally in the front cutting plane. In this way, the planer 2 will be installed on the working surface 11 and begin to work; if the position of the fence 4 is fixed, the minimum distance between the blade shaft 23 and the fence 4 is the distance between the planing line and the fence 4, which is equal to the distance between the part of the circular saw blade 33 which works above the working surface and the fence 4. In this way, when cutting and planing the workpiece, the working surface of the circular saw blade 33 and the blade shaft 23 will be on the same plane. After the cutting, by fine tuning the fence 4, the planing work can be conducted. In addition, the displacement amount of the fence is the planing amount.

In this embodiment, there is only one set of first installation mechanism 19 at the back of the circular saw blade 33, and when the planer 2 is planing the workpiece, it makes the fence 4 located at the front of the work table 10 compared to the blade shaft 23, and the distance between the circular saw blade 33 and the fence 4 is the distance between the front cutting plane and the fence 4; however, optionally, the first installation mechanism 19 can also be located at the front of the circular saw blade 33, which makes the fence 4 located at the back of the work table 10 compared with the blade shaft 23 when the planer 2 is planing the workpiece, and at this time, the planing line of the blade shaft 23 must be located on the back cutting plane of the circular saw blade 33; in this way, when planer 4 and the circular saw blade 33 are working respectively, if the location of the fence 4 is fixed, the minimum distance between the blade shaft 23 and the fence 4 is still equal to the distance between the circular saw blade 33 and the fence 4; the work table 10 can have two sets of first installation mechanism 19 with two locations mentioned above at the same time, but its setting method requires that when the planer 2 is installed on any set of first installation mechanism 19, the planing line during the work of the blade shaft 23 is basically on the plane where the cutting plane is located during the working of the circular saw blade 33; i.e., if the location of the fence 4 is fixed, the minimum distance between the blade shaft 23 and the fence 4 is still equal to the distance between the circular saw blade 33 and the fence 4.

Through the preferred installation method of planer 2 mentioned above, the table saw 1 can have an optimized work procedure consisting of a rough machining phase and a fine machining phase; during the rough machining phase, the operator has to firstly make sure that the long board 193 is off the long slot 193 and the short board 194 covers the short slot 192, and move the circular saw blade 33 to an appropriate location on the working surface 11; then, adjust the fence 4 to an appropriate location by referring to the scale, and lean one side of the workpiece on the fence 4, and slide toward the circular saw blade 33 along the fence 4 to make the circular saw blade 33 rotary cut the workpiece. When the workpiece is cut off, if the section is rough, further fine machining can be conducted, and at this time, move the circular saw blade 33 downward to be under the working surface 11, use the long board 193 to cover the long slot 191, and move the short board 194 off the short slot 192; install the planer 2 through the studs 292 and holes 19, and then slide the fence 4 in accordance with the specific situation to conduct fine tuning toward then direction of the planer 2; then, start the planer 2, and lean one side of the workpiece on the fence 4, and slide toward the blade shaft 23 along the fence 4 to make the blade shaft 23 conduct planing to the workpiece; because the planing line is located on the front cutting plane, the distance which the fence 4 moves toward the planer 2 is the size of planning. In this way, through rough machining and fine machining, we can get a workpiece with even section and precise specifications.

The cutting device 3 and the planer 2 can work independently, but they cannot work at the same time.

A specific description of the planer 2 in the present invention will be given in the following.

Figure 4:
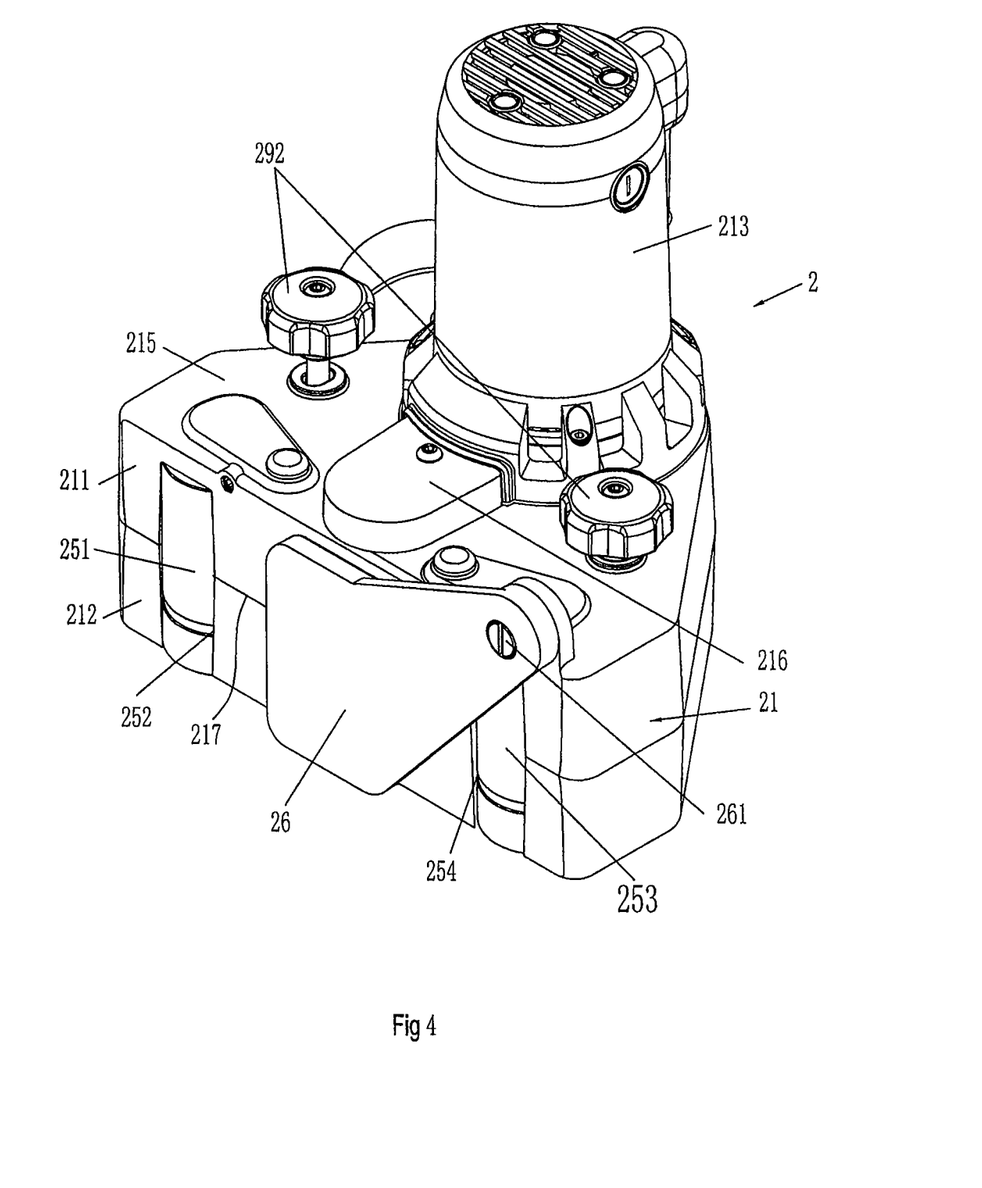
FIG. 4 is shows the planer of the first embodiment for the subject invention.
Figure 5:
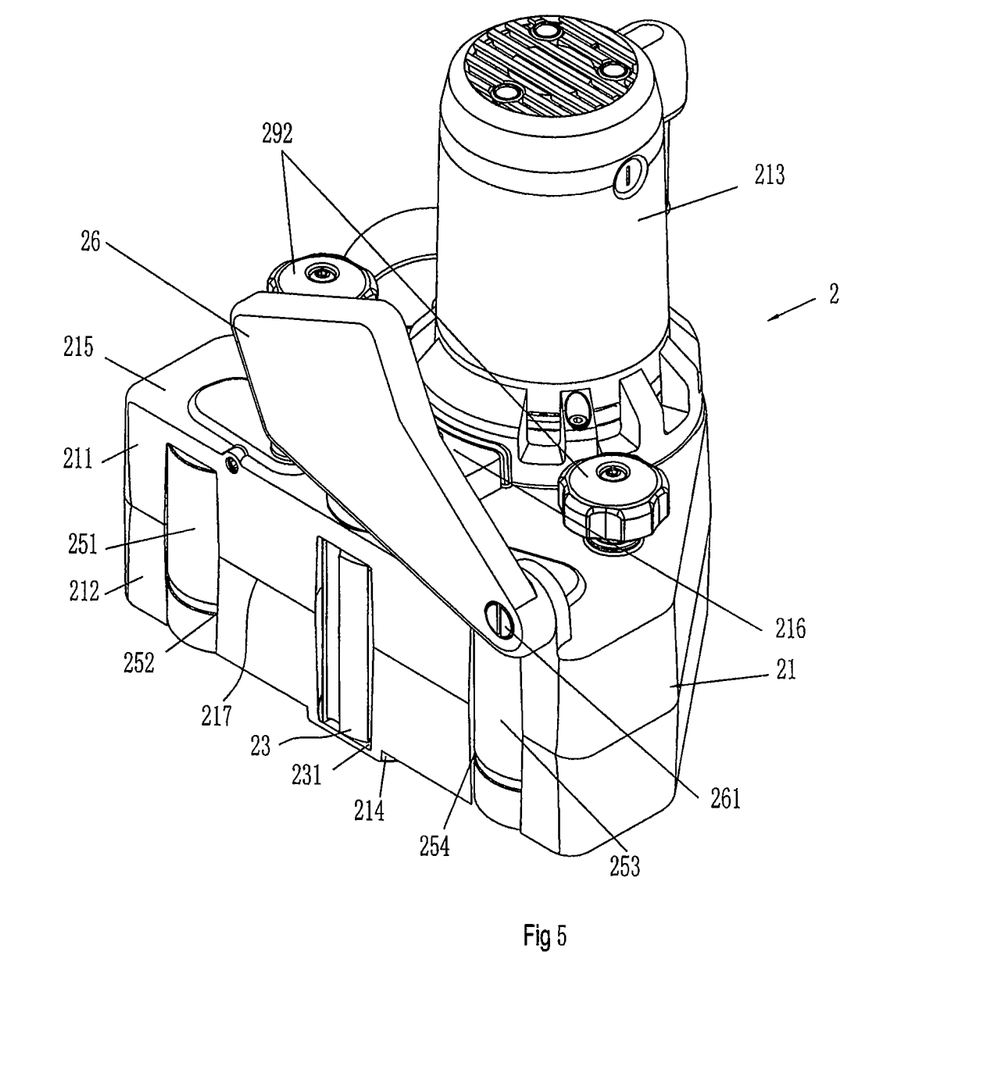
FIG. 5 shows the view of planer when the guard in opening position.

As shown in FIGS. 4 and 5, the housing 21 of the planer 2 includes the motor housing 213, upper housing 211 and lower housing 212 from up to down, and they are connected successively by the screw-hole device. The bottom of the lower housing 212 is installed with a convex 214 which bulges downward; when the planer 2 is installed on the work table 10, the convex 214 is installed on the short slot 192 of the work table 10, and the blade shaft 23 is installed between the top of the upper housing 211 and the convex 214 at the bottom of the lower housing 212; when the planer 2 is installed on the work table 10, the bottom of the blade shaft 23 is slightly lower than the working surface of the work table 10, so in this way, the blade shaft 23 can plane thoroughly to the bottom of the workpiece, and incomplete planing of workpiece bottom caused by the slit between the blade shaft 23 and the work table 10 can be avoided.

As shown in FIGS. 4 and 5, the housing 21 has an upper surface 215 formed by the top of the upper housing 211 and a planing surface 217 which is suitable to face and connect the workpiece. The motor housing 213 is above the upper surface 215, where a second motor is located (not shown in the figure). The upper surface 215 is also installed with belt wheel housing 216 and two holes 291 mentioned above, and the said holes 291 can hold the said two studs 292.

Preferably, the hole 291 can be set as a longitudinal hole, so that after installation, the planer 2 can have a small movement along the direction of axis Y to adjust the circular saw blade 33 and make the planing line of the blade shaft 23 to be exactly on the cutting plane of the circular saw blade 33. In order to accurately adjust the position of the planer 2, an adjustment device 293 is set between the planer 2 and the work table 10 (see FIG. 6). The adjust device 293 includes a base 294 fixedly connect to the work table 10 and a adjustment screw 295 fixedly connect to the planer 2; the adjustment screw 295 is installed on the base 294 by screws, and the adjustment screw 295's movement along the axis direction can be conducted through rotary adjustment which can also cause a slight movement of the planer 2 along the direction of axis Y, and in this way to adjust the blade shaft 23. This adjust device 293 is well known to technicians in this field, and we won't make further elaboration here.

On the planing surface 217 is arranged with three slots in an interval along the direction of axis Z, and they are successively the first roller slot 252 used to install the first roller 251, the blade shaft slot 231 to install the blade shaft 23 and the second roller slot 254 used to install the second roller 253. The said blade shaft 23 partly protrudes above the said planning surface 217 at the radial direction. The said first roller 251 and second roller 253 are cylinders of the same size and shape movably installed in the housing 21 at the radial direction, the diameter of which is larger than the width of the first roller slot 252 and the second roller slot 254. The first roller 251 and the second roller 253 can pivot around their longitudinal axes. When the said first roller 251 and second roller 253 totally protrude, the length they protrude above the planing surface 217 on the direction of axis Y is no shorter than the length protruded by the blade shaft 23 on the direction of axis Y outside the planing surface 217; when oppressed, the first roller 251 and second roller 253 can completely retract to be within the planing surface 217. During planing of workpiece, the workpiece oppressed the first roller 251 and second roller 253 back to the planing surface 217, and the first roller 251 and second roller 253 also impose a opposing force to the workpiece and make it tightly stick to the fence 4 to improve accuracy and stability of the planing process. Furthermore, in this preferred embodiment, both the first roller 251 and second roller 253 have adopted rubber materials with a relatively big frictional force, so that during the planing process, the workpiece can lead the first roller 251 and second roller 253 to pivot around their longitudinal axes, enabling a more smooth and stable feeding process.

The planing surface 217 is also installed with a guard 26, and the said guard 26 installed on the side of the planing surface 217 by a pin 261, and it can turn around between an opening position and a closing position through this pin 261; in the said closing position, the said guard 26 covers the said blade shaft slot 231, and in the said opening position, the said guard 26 uncovers the said blade shaft slot 231. No matter whether the planer 2 is started or not, both of the said first roller 251 and second roller 253 protrude outside of the planing surface 217, and the guard 26 will be in the closing position for safety protection; only when the workpiece is pushed tightly along the planing surface 217 from the side of the guard 26 to the other side is the guard 26 pushed to the opening position, and the first roller 251 and second roller 253 will be pressed back to be within the planing surface 217, and the blade shaft 23 planes the workpiece. During the planing process, the workpiece itself forms a cover to the blade shaft 23; after the planing, the first roller 251, the second roller 253 and the guard 26 will return to their original positions, so in this way, the operator will always be in a safe state during the whole process from preparation to completion of planing.

A specific description of the planer 2 will be given in the following by referring to FIG. 6. The second motor in the motor housing 213 has a motor output shaft (not shown in the figure), which is enclosed with a belt 22, and the belt 22 is also coupled with a belt wheel 232; the said belt wheel 232 is located on the upper surface 215 of the planer 2, and installed at the upper blade shaft 233 of the blade shaft 23 which has passed through the upper housing 211, and the said blade shaft 23 also has a lower blade shaft 234 installed at the bottom of the lower housing 212. Through the structure mentioned above, rotary output of the second motor is transferred to the blade shaft 23 through the belt 22 and the belt wheel 232, which makes the blade shaft 23 to conduct rotary planing. The said upper surface 215 is also installed with a belt wheel housing 216 which covers the said belt 22 and belt wheel 232.

The said first roller 251 and second roller 253 are installed between the upper housing 211 and the lower housing 212 on the two sides of the blade shaft 23, and they have the same structure and installation method; in the following, description will be given by using the first roller 251 as the example: the first roller 251 is pivotably installed in the first roller stand 241, and the first roller stand 241 has the first principal shaft 242 pivotably installed between the upper housing 211 and the lower housing 212; the first convex wall 244 is installed in the lower housing 212, and the first spring 243 is installed between the first convex wall 244 and the first principal shaft 242, which can push the first principal shaft 242 pivot to further push the said first roller 251 protruding outside of the planing surface 217. The planer 2 also has the second roller stand 281, the second principal shaft 282, the second convex wall 284 and the second spring correspondingly installed to the blade shaft 23 (not shown in the figure).

The said guard 26 is installed on the part of the upper housing 211 which is on the side of the planing surface 217 via the pin 261, and a torsional spring 262 is installed between the guard 217 and the upper housing 211; the said torsional spring 262 oppresses the guard 26 in its closing position.

A dust collection device 219 is also installed between the upper housing 211 and the lower housing 212, the specific structure of which is not related to the present invention, so we won't make further elaboration here.

In combination with FIGS. 7 and 8, the second preferred embodiment will be detailed hereinafter to further explain the creation concept of the present invention.

Figure 7:
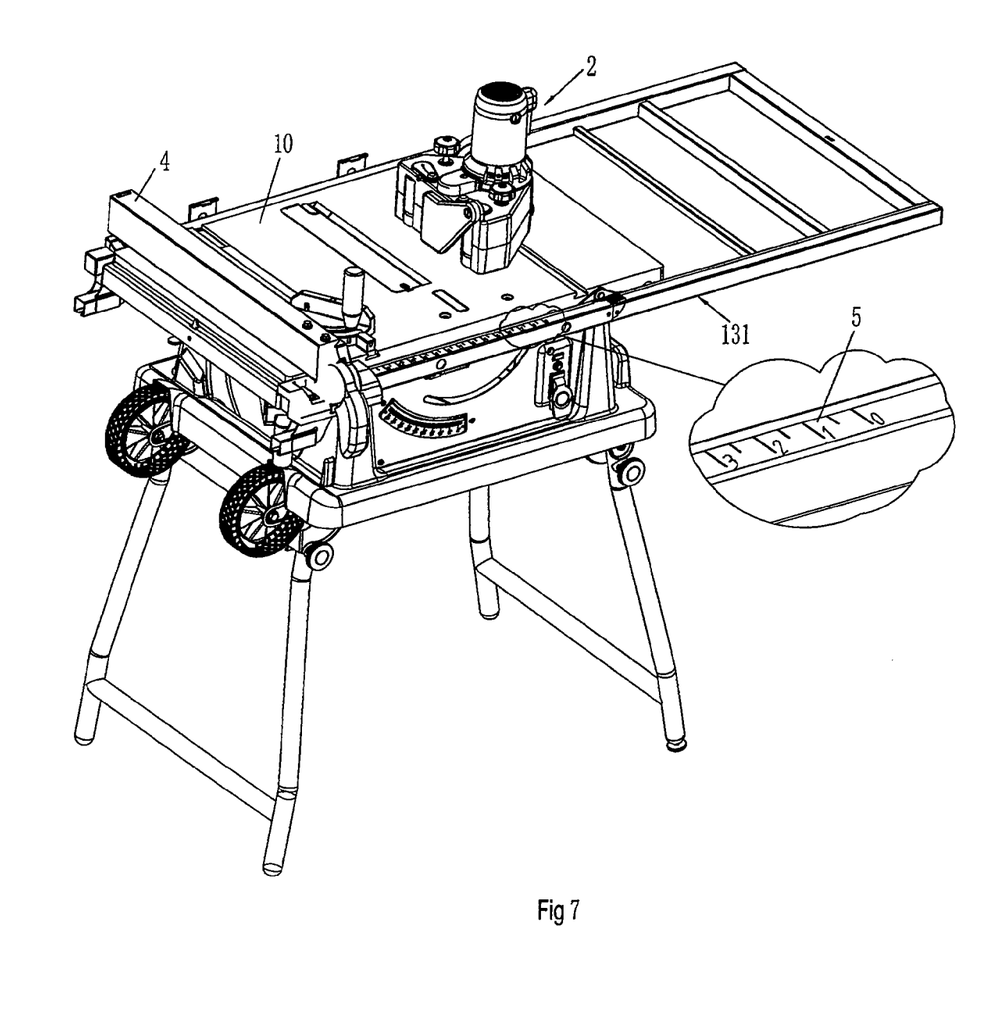
FIG. 7 shows the second embodiment for the subject invention when the scale rule aligned with the planer.

As shown in FIG. 7, the planer 2 is installed far behind the long slot 191, so the cutting line of the planer 2 and the cutting plane of the circular saw blade 33 won't be in the same plane anymore. At this time, the frame 131 is installed with a scale rule 5 which can slide along axis Y and be fixed at the preset position. The scale rule 5 can slide in the slot of the frame (not shown in the figure), and its fixation method is the screw compact structure well known in the industry, so we won't elaborate here. The scale rule 5 shall have at least one 0 scale mark as the benchmark scale to measure the workpiece specifications. When the planer 2 is working, the operator can move the scale rule 5 to align its benchmark of 0 scale mark with the cutting line of the planer 2, i.e., the most outside to the fence 4 when the blade shaft 23 is working.

Figure 8:
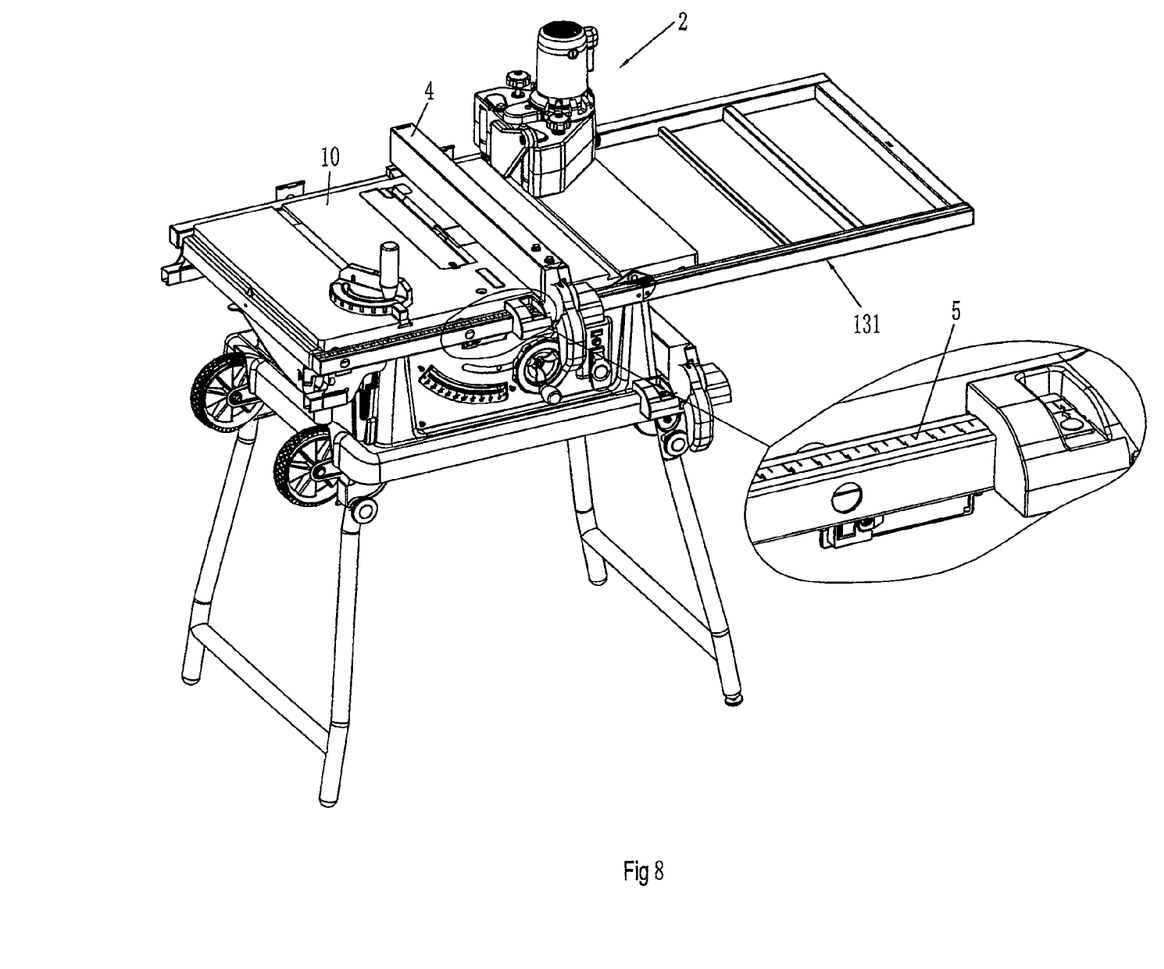
FIG. 8 shows the second embodiment for the subject invention when the scale rule aligned with the cutting mechanism.

As shown in FIG. 8, the planer 2 is off the work table 10. The benchmark of 0 scale mark of the scale rule 5 is aligned with the cutting plane of the cutting device, i.e., the most outside of the circular saw blade 33 to the fence 4.

This embodiment has a preferred work procedure, i.e.: firstly, put the cutting device 3 on its working state, and the operator adjusts the location of the scale rule 5 to align its benchmark of 0 scale mark with the cutting plane of the circular saw blade 33, then adjust the fence 4 to an appropriate position in accordance with the cutting requirement of the workpiece, and cut the workpiece, and this position will have an marked scale on the scale rule 5; then, put the planer 2 on its working state, adjust the scale rule 5 to align its benchmark of 0 scale mark with the planing line of the planer 2, and then adjust the fence 4 to an appropriate position in accordance with the marked scale, and plane the workpiece.

Although the planing line and cutting plane of this embodiment are not in the same plane, during workpiece cutting and planing by the table saw 1, by setting up scale rule 5 with adjustable positions, the benchmark of 0 scale mark of the scale rule 5 can be aligned with the cutting plane and planing line, so that they will have the same benchmark scale, and the marked scale of cutting can be referred to during the planing.

I claim:

1. A table saw, including:
   a work table, including a working surface for supporting said work piece;
   a scale ruler which is connected to said working surface;
   a fence, slidably arranged on said work table for supporting said work piece;
   a first motor, arranged below said working surface of the work table;
   a blade having an outer edge adjacent said fence when partly protruding out of the working surface during the cutting process, driven by said first motor for cutting motion, and characterized in that:
   a planer detachably arranged on said work surface, including a housing, a second motor located in said housing and a blade shaft driven by said second motor to rotate about its longitudinal axis, wherein the blade shaft having an outer edge adjacent to said fence when arranged on said work surface; and,
   wherein said outer edge of the blade and said outer edge of the blade shaft respectively align with a same scale mark of said scale rule.

2. A table saw according to claim 1, characterized in that: when said planer is arranged on said work surface, the longitudinal axis of said blade shaft keeps perpendicular to said work surface.

3. A table saw according to claim 1, characterized in that: a frame is connected to the edge of said table, said scale rule slidably installed on the said frame, the scale mark of said scale rule optionally aligned with the outer edge of the blade adjacent to said fence or the outer edger of the blade shaft adjacent to said fence.

4. A table saw according to claim 1, characterized in that: said blade forms a cutting planing at work to cut off a part of the work piece which extends beyond the cutting plane, when said planer is arranged on said working surface and works, said blade shaft have a plane line for planing the part of the work piece outside the plane line; and said cutting planings and said plane line are substantially located in a same plane.

5. A table saw according to claim 4, characterized in that: said plane line is the blade shaft's most outer end away from the housing of said plane, when said blade shaft is driven to rotate by said second motor.

6. A table saw according to claim 1, characterized in that: said blade is a circular saw blade.

7. A table saw according to claim 1, that includes: means locating said blade is below the work surface when said planer works.

8. A table saw according to claim 1, characterized in that: a first installation mechanism is located on said work surface; a second installation mechanism matching with said first installation mechanism located on said planer; and, said planer detachably installed on the work surface through said first installation mechanism and said second installation mechanism.

9. A table saw according to claim 8, characterized in that: said first installation mechanism are two screw holes set in the table, and said second installation mechanism are two holes and two stud set in said planer correspondingly.

10. A table saw according to claim 1, characterized in that: said fence includes two slide racks and a plate between said two slide rack, said slide rack slidably installed on the table saw, one of the slide rack includes a locking handle which operably locks the position of said fence.

11. A table saw according to claim 10, characterized in that: at least one side of said plate is a work piece support surface which is parallel with said blade.

12. A table saw according to claim 1, characterized in that: said planer including a guard, said guard rotatably mounted at said planing surface by a pin, said guard has a closing position at which said guard covers said blade shaft, and an opening position at which said guard uncovers said blade shaft, said guard is connected to a spring which biases said guard to said closing direction.

13. A table saw according to claim 1, characterized in that: said planer includes rollers, said rollers movable in said housing of said planer, and optionally protruding outside of said housing so as to press said work piece close to said fence.

14. A table saw according to claim 13, characterized in that: said rollers are cylindrical and connect to a spring which biases said rollers outside of said housing.

15. A table saw according to claim 1, characterized in that: said planer including a dust collection device.

16. A table saw according to claim 1, characterized in that: when said planer installed in the work table, the bottom of said blade shaft is below said work surface.

17. A table saw, including:
    a work table, including a working surface for placing a work piece;
    a fence, slidably arranged on said work table for support said work piece;
    a first motor, arranged below said working surface of the work table;
    a blade driven by said first motor for cutting motion, and at least part of the blade is protruding out of the working surface of the work table in the cutting process, characterized in that:
    a planer detachably arranged on said work surface, said planer including a housing, a second motor located in said housing and a blade shaft driven by said second motor to rotate about its axis; and
    an adjust device located between said planer and said work table, including a base fixed to said work table and an adjustment removably installed on said table.

\* \* \* \* \*

UNITED STATES PATENT AND TRADEMARK OFFICE
CERTIFICATE OF CORRECTION

| | | |
|---|---|---|
| PATENT NO. | : 8,746,668 B2 | Page 1 of 2 |
| APPLICATION NO. | : 13/126453 | |
| DATED | : June 10, 2014 | |
| INVENTOR(S) | : Warren Brown | |

It is certified that error appears in the above-identified patent and that said Letters Patent is hereby corrected as shown below:

Title Page, (57) Abstract, in the first sentence, line 3, between "for" and "said" delete "support" and insert instead --supporting--.

In the specification:

Column 1, line 8, between "Oct. 29," and "and" delete "2010" and insert instead --2009--.
    line 60, between "on" and "workpiece" insert --the--.
    line 61, before "subject" delete "the" and insert instead --The--.
    line 64, between "port" and "said" insert --of--.

Column 2, line 11, between "when" and "partly" delete "it".
    line 12, after "blade shaft" delete "have" and insert instead --having--.
    line 13, between "it" and "arranged" insert --is--.
    line 23, after "work for" delete "cut" and insert instead --cutting--.
    line 24, between "which" and "beyond" insert --is--.
    line 25, between "planer" and "arranged" insert --is--.
    line 26, between "shaft" and "a" delete "have" and insert instead --having--.
    line 31, between "of" and "planar," insert --the--.
    line 32, between "shaft" and "been" insert --has--.
    line 46, between "slide" and "said" delete "rack," and insert instead --racks,--.
    line 47, between "slide" and "includes" delete "rack" and insert instead --racks--.
    line 48, between "which" and "lock" delete "operable lock" and insert instead --operably locks--.
    line 53, after "surface at" insert --a--.
    line 59, after "spring which" delete "biasing" and insert instead --biases--.
    line 66, between "which" and "said" delete "biasing" and insert instead --biases--.
    line 67, between "planer" and "a" delete "including" and insert instead --includes--.

Signed and Sealed this
Fourteenth Day of October, 2014

Michelle K. Lee
*Deputy Director of the United States Patent and Trademark Office*

CERTIFICATE OF CORRECTION (continued)
U.S. Pat. No. 8,746,668 B2

Column 3, line 1, between "planer" and "installed" insert --is--.
        line 20, between "4" and "shows" delete "is".
        line 22, between "guard" and "in" insert --is--.
        line 33, between "By" and "FIGS." delete "combing" and insert instead --combining--.
        line 48, between "with" and "frame" delete "an" and insert instead --a--.

Column 6, line 3, between "the" and "of" delete "work" and insert instead --working--.
        line 54, between "of" and "workpiece" insert --the--.

Column 7, line 7, between "fixedly" and "to" delete "connect" and insert instead --connected--.
        line 43, between "longitudinal" and "enabling" delete "axes," and insert instead --axis,--.
        line 46, between "26" and "installed" insert --is--.

Column 9, line 2, before "marked" delete "an" and insert instead --a--.

In the claims:

Column 10, line 37, between "planar" and "a" delete "including" and insert instead --includes--.
        line 44, after "for support" insert --of--.